Aug. 30, 1960 F. R. McLARNEY ET AL 2,950,893
SWIVEL LATCHING DEVICE
Filed July 31, 1958

INVENTORS
FRANK R. McLARNEY
&
EDWARD L. HAMPTON

BY *Arthur H Robert*
ATTORNEY

United States Patent Office 2,950,893
Patented Aug. 30, 1960

2,950,893

SWIVEL LATCHING DEVICE

Frank R. McLarney, Louisville, and Edward L. Hampton, St. Matthews, Ky., assignors to Middletown Manufacturing Company, Middletown, Ky., a corporation of Kentucky Filed July 31, 1958, Ser. No. 752,366

1 Claim. (Cl. 248—349)

This invention relates to a locking or latching device for swivels of the type commonly used to mount one furniture article rotationally upon another, such as a television cabinet upon a base.

A conventional swivel for rotatably supporting a furniture article on a base comprises: upper and lower plates attached respectively to the rotary furniture article and the base; bearing means sandwiched between the plates to facilitate their relative rotation; and a central rivet interconnecting the plates at their centers and providing the axis about which the plates can rotate relative to each other. This construction allows the rotary furniture article to be turned to a desired angular position relative to the base. Often, it is desirable to lock the rotating furniture against rotation relative to the base and this may be done by locking the upper and lower plates of the swivel together.

The principal object of this invention is to provide a novel swivel lock which is strong, effective, simple to operate and inexpensive to manufacture.

Other objects of the invention are: to provide a swivel lock which can be shipped with or separately from the swivel; to provide one which can be easily and quickly installed on the furniture either before or after the swivel is installed; and to provide one having a pivotally-mounted locking arm which operates to lock the plates of the swivel without placing any of the swivel load upon the pivot of the lock arm.

These objects are accomplished in swiveled furniture by drilling detent-receiving holes in each of the swivel plates at locations equidistant from the swivel axis so that the holes can be aligned at a selected relative angular position of the swivel plates and by extending the detent of a locking member upwardly through both holes to lock the swivel plates together. In the disclosed form of the invention, this locking member comprises an L-shaped lock arm having a horizontal leg and an upright foot or detent. The leg is pivoted intermediate its length on the furniture base by a screw at a location wherein it can be manipulated to swing the foot upwardly from an unlocking position wherein it extends through the opening in the adjacent plate but is spaced from the opening in the other plate, to a locking position wherein it extends through both aligned holes in the swivel plates to lock them together. A spring washer is located on the pivot screw of the leg to press the leg against the base and frictionally hold it in its locking or non-locking position.

The invention is illustrated in the accompanying drawings wherein.

Figure 1:
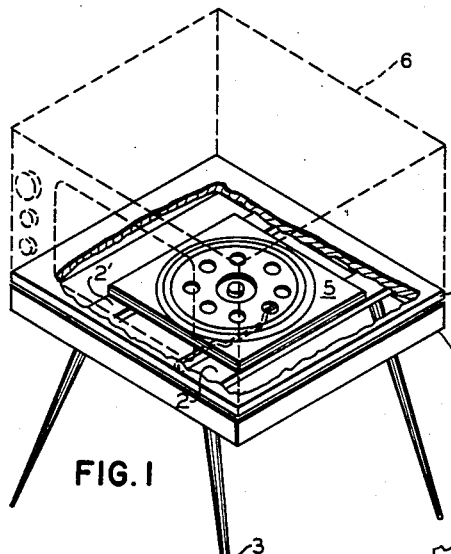
Fig. 1 is a cut-away perspective view of the novel lock installed on a rotating television stand with a swivel and illustrating a television cabinet in dotted lines supported on the stand.

The conventional television cabinet stand or table 1 illustrated in Fig. 1 includes: a rectangular upper horizontal frame, also designated 1, containing a pair of parallel cross braces 2 and 2' extending between the front and rear sides of the frame 1; a set of downwardly projecting supporting legs 3, each of which is fixed at its upper end to a respective end of a cross brace; a rotary table top 4; and a conventional swivel 5 interposed between the table top 4 and the cross braces 2 and 2' and attached to both. A conventional television cabinet 6 is illustrated in dotted lines supported on the rotary table top 4 and can be turned with the table top to a selected viewing position on the stand 1.

Figure 3:
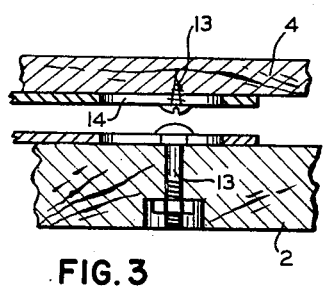
Fig. 3 is a section taken on lines 3—3 of Fig. 2.
Figure 2:
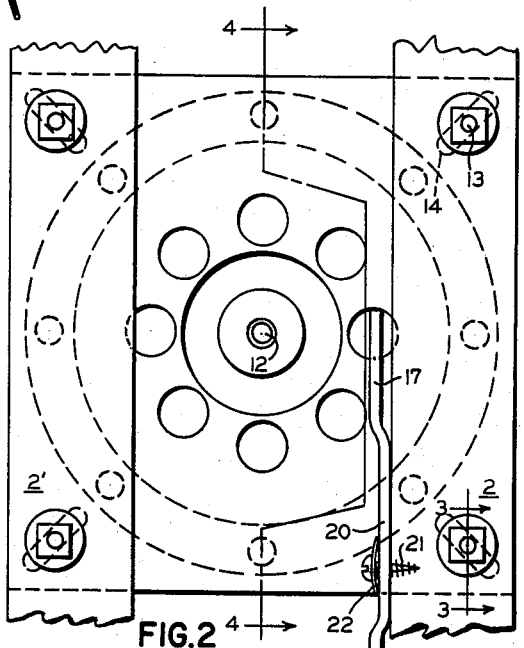
Fig. 2 is a fragmentary enlarged bottom plan view of the lock, swivel and central area of the television stand of Fig. 1.
Figure 4:
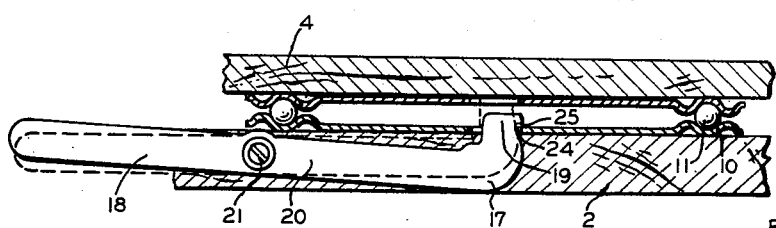
Fig. 4 is a section taken on lines 4—4 of Fig. 2.

The conventional swivel 5, looking at Figs. 2 to 4, includes: an upper plate 8 overlying a similar lower plate 9, both of which are formed with corresponding annular ball bearing raceways 10; a set of ball bearings 11 sandwiched in the raceways 10 between the plates and held in spaced relation to each other around the raceways by a conventional spacer ring which is not shown; and a central rivet 12 extending through the centers of the plates, which are normally dished inwardly at their centers, to hold the two plates together and provide the axis around which the plates can rotate relative to each other. The corners of the upper plate 8 are attached to the underside of the table top 4 and the corners of the lower plate 9 are attached to the upper faces of the cross braces 2 and 2' by conventional threaded fasteners 13, shown in Fig. 3, extending through radially slotted holes 14 in the plates. The slotted holes 14 allow the adjustment and alignment of the swivel after it is installed.

The described swivel is adapted for use with the novel swivel lock by drilling a series of detent holes through both of the plates 8 and 9 spaced along a circular path concentric with the axis rivet 12, the detent holes in the upper plate 8 being designated 15 and those in the lower plate 9 being designated 15'. Actually, it is only necessary to drill one detent hole 15' in the lower swivel plate 9 at the selected location, but normally, both plates will be identical and, therefore, will contain the same number of detent holes 15 and 15'.

The novel L-shaped swivel locking arm 17 is clearly shown in Figs. 2 and 4 and comprises an elongate leg 18 serving as a lock operating handle and a short upstanding foot 19 serving as a lock bolt. The leg 18 includes an intermediate offset 20 riding against the stand cross brace 2 and pivoted on the cross brace by a wood screw 21 loosely extending through the offset 20 and threaded into the cross brace 2. A spring washer 22 is arranged on the screw 21 to force the offset 20 against the side of the cross brace 2 and serves to frictionally hold the locking arm 17 against dropping from a swivel locking position.

The leg 18 is located on the cross brace 2 so that the foot 19 at the end of the leg 18 projects upwardly through a selected detent hole 15' in the lower plate 9 and can be pivoted upwardly to enter a selected detent hole 15 in the upper plate 8 and lock the upper plate against rotation relative to the lower plate 9. The "bottom" of the foot 19 remote from the leg 18 is cut away from a point 24 upwardly and inwardly to form a shoulder 25, that is spaced from the upper end of the foot, to allow clearance for vertical oscillatory movement of the foot 19 through the hole 15' in the lower plate 9 between swivel locking position and swivel unlocking position. The shoulder 25, spaced from the upper end of the foot 19, rests against the lower plate 9 in the swivel unlocked position, shown in Fig. 4 in solid lines, and supports the foot 19 against dropping completely out of the hole 15' in the lower plate 9.

Figure 5:
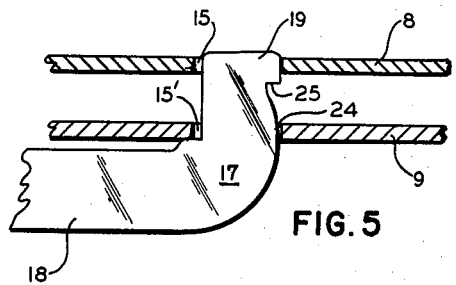
Fig. 5 is an enlarged fragmentary view of Fig. 4 with the lock in swivel locking position.

In the locked position of the foot 19, seen in Fig. 5, its upper end is seated snugly in the selected hole 15 in the upper plate and the lower end of the foot snugly engages the edges of the hole 15' in the lower plate 9 so as to allow substantially no relative movement between the plates 8 and 9.

In operating the novel swivel lock, assuming the foot 19 to be in its down, swivel-unlocked position with the shoulder 25 resting against the plate 9 as shown in solid lines in Fig. 4, the operator turns the upper rotary furniture article to approximately the desired angular position, then presses downwardly on the handle end of the leg 18 of the locking arm 17 and swings the rotary furniture article back and forth through a small arc until feeling the upper end of the foot 19 move upwardly into a detent hole 15 in the upper swivel plate 8. The furniture article is now locked against rotation relative to its support base. To unlock the furniture article for rotation, the operator merely presses upwardly on the free end of the leg 18 of the L-shaped locking arm 17 to swing the foot 19 downwardly away from the upper swivel plate 8.

Having described our invention, we claim:

A swivel locking device for a piece of furniture having a rotatable member mounted on a base member by an interposed swivel of the superposed plate type, comprising: means forming at least one opening on each of said swivel plates, said openings being located at equal distances from the swivel axis; and a lock element having a horizontally extending handle adjacent the plate on one member and a vertical bolt extending through the opening in said adjacent plate, said handle being pivoted on said one member for swinging movement in a vertical plane between a locking position wherein the bolt extends through both of said openings and an unlocking position wherein it extends through the opening in the said adjacent plate but is spaced from the opening in other plate; said bolt having spaced portions in snug engagement with the surrounding edges of both of said openings when the bolt is in said locking position; said bolt also having a cut-away portion located between said spaced portions to allow said bolt to swing freely through the said adjacent plate opening during its movement between said locking and unlocking positions, said cut-away portion providing a shoulder adjacent the outer end of said bolt for abutting the inner face of said adjacent plate in said unlocking position.

References Cited in the file of this patent

UNITED STATES PATENTS

| | | |
|---|---|---|
| 134,697 | Musser | Jan. 7, 1873 |
| 1,304,454 | Carlisle | May 20, 1919 |
| 1,409,257 | Staley | Mar. 14, 1922 |
| 1,932,697 | Jankovic | Oct. 31, 1933 |
| 2,671,631 | Fox | Mar. 9, 1954 |